Dec. 5, 1967     T. T. LUNDE     3,356,058

LOG TRANSPORTING VESSEL

Filed Feb. 2, 1966     2 Sheets-Sheet 1

INVENTOR.
THOMAS T. LUNDE
BY *Hoppe, Mitchell, Murtha*
*and Anderson*

ATTORNEYS

Dec. 5, 1967  T. T. LUNDE  3,356,058
LOG TRANSPORTING VESSEL
Filed Feb. 2, 1966  2 Sheets-Sheet 2
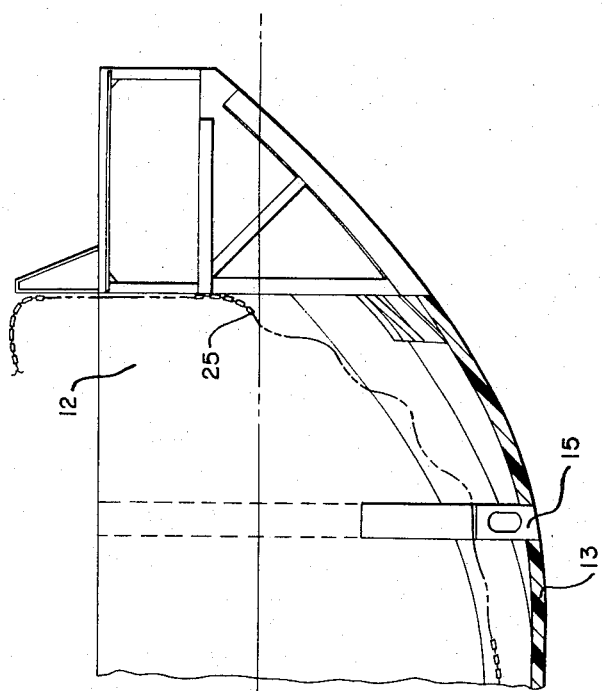
FIG. 2
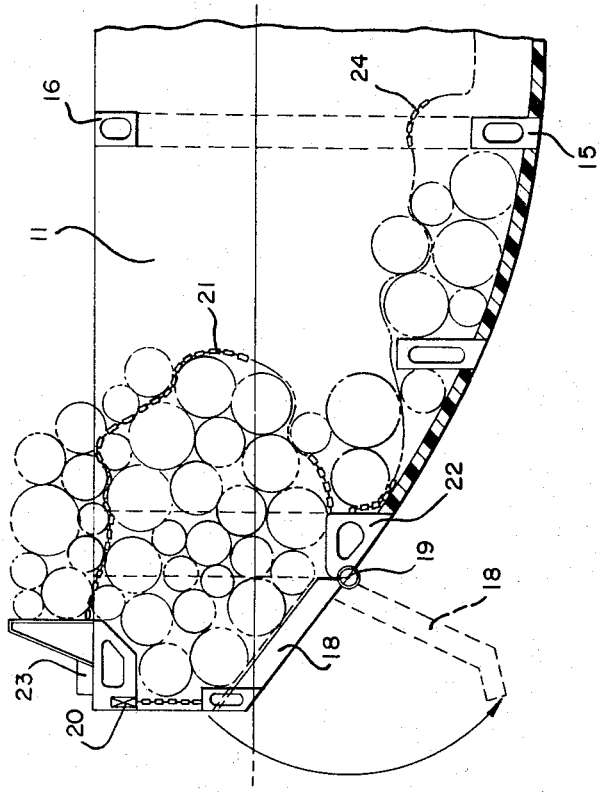
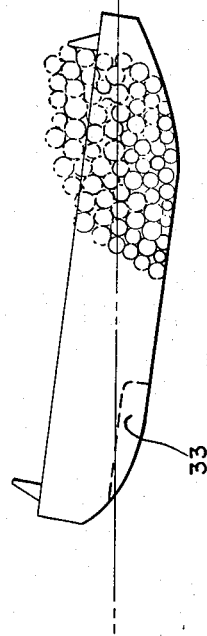
FIG. 6
FIG. 5
*INVENTOR.*
THOMAS T. LUNDE
BY *Hopper, Mitchell, Murtha and Anderson*
ATTORNEYS 3,356,058
LOG TRANSPORTING VESSEL
Thomas T. Lunde, San Francisco, Calif., assignor to Lunde Carriers, a limited partnership
Filed Feb. 2, 1966, Ser. No. 526,640
6 Claims. (Cl. 114—27)

This invention relates to vessels for transporting logs, such as a log barge. The invention is more particularly directed to an improvement in vessels capable of transporting logs long distances over open seas.

In brief, the present invention involves a log barge or vessel that defines a flooded enclosure having a rigid submarine surface. Although that surface may support part of the weight of logs contained within the enclosure, by far the greatest portion of the weight is supported by the buoyancy of the logs themselves. The vessel further comprises a gate through which logs may be floated into the enclosure for pick-up as well as discharge. For this purpose, the gate is mounted with its lower portion below the low water line, the upper edge of the gate being above the high water line. Means for releasably latching the gate in an inclined position is provided to support logs thereon and to retain logs in the enclosure during their transportation. Additionally, means is provided for initiating a flow of logs from the enclosure at points remote from the gate upon release of the latching means.

The invention further contemplates the use of a plurality of lines, which can be used for leveling a load of logs within the enclosure or moving the logs toward the gate. By locating the gate at the stern end and extending the lines longitudinally of the vessel, the logs may be grouped into lots or bundles for separate discharge as well as providing means for moving the logs toward a common gate.

The invention also contemplates the use of ballast means for trimming the vessel as it is unloaded, thereby maintaining the lower edge of the gate below the low water line as logs are discharged from the enclosure.

Another feature of the invention is to be found in the use of a floating bottom wall comprised of foamed polychemicals, such as polyurethane, sandwiched between inner and outer tank plates. Wall structures of this type obviate the need of painting the interior surfaces of the tank plates. Therefore, the surface of the plates may be much shallower than would otherwise be possible, resulting in definite savings in storage space. And, because the exterior water loading on the plates is continuously supported, large plate spans may be used and the plates themselves may be relatively thin. These advantages are exceedingly important to the practical construction and use of a flooded enclosure of the type contemplated.

Another feature is the provision of auxiliary discharge ports located at the low water line of the vessel and remote from the gate. Such auxiliary discharge ports permit the removal of logs through the sides of the vessel during the final stages of unloading.

In view of the above brief description of the invention, it will be apparent that a principal object is to provide a vessel for transporting logs that may be quickly loaded and unloaded while lending itself to a high speed hull design.

Another object is to provide a vessel of a kind described which is relatively inexpensive to construct and operate, and yet one which is seaworthy.

Another object is to provide a vessel for transporting logs that defines a flooded enclosure having a rigid submarine supporting surface, together with an arrangement of chains or other means for breaking down the piles of logs to assist unloading and for trimming the vessel.

It is another object to provide a vessel for transporting logs having a flooded enclosure and means for separating logs within the enclosure into various lots while simultaneously providing means for partially discharging one or more lots from the enclosure.

A still further object of the invention is to provide a vessel of the kind described having ballast means for trimming the vessel as logs are being discharged.

A further object is to provide a vessel of the kind described including means for initiating a flow of logs from points remote from the gate as said gate is opened.

And yet another object of the invention is to provide a vessel for transporting logs, having a buoyant but flooded enclosure comprising a bottom wall made of foamed polychemicals sandwiched between inner and outer plates.

A still further object of the invention is to provide a vessel for transporting logs comprising buoyant means defining a flooded enclosure including a gate, the lower portion of said gate being below the low water line and the upper edge of said gate being above the high water line, and further comprising means for releasably latching said gate in an inclined position to support logs thereon, a release of said gate initiating a flow of logs from the enclosure.

Other objects of this invention will become apparent in view of the following detailed description and the accompanying drawing.

In the drawing forming a part of this application, and in which like parts are identified by like reference numerals throughout the same, FIG. 1 is a substantially side elevation of a vessel for transporting logs constructed in accordance with the teaching of this invention;

FIG. 2 is a broken longitudinal section of the vessel showing stern and bow portions in detail;

FIGS. 5 and 6 schematically illustrate stern trimming of the vessel by flooding a ballast tank.

Figure 1:
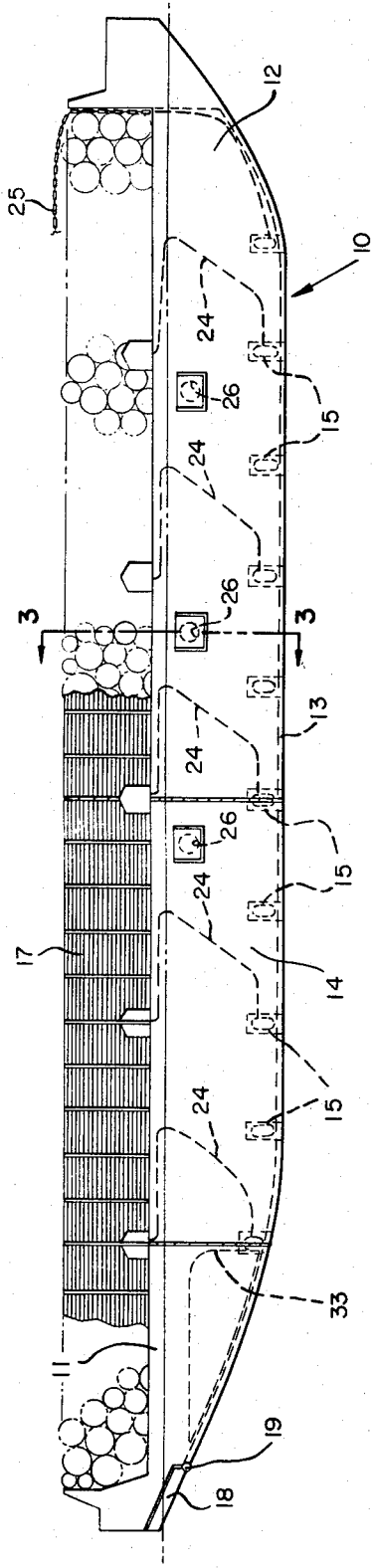

Referring to FIGS. 1 and 2 in particular, there is shown a vessel 10 made in accordance with the teachings of this invention and capable of being used for transporting logs on the ocean. Vessel 10, as shown, is constructed as a barge having a flooded enclosure that is essentially defined by stern and bow sections 11 and 12, a rigid submarine supporting surface 13 and a pair of buoyant side walls 14. The side walls are interconnected by a plurality of hollow transverse bottom girders 15 and upper transverse tie girders 16. It is contemplated that side walls of the vessel should extend above the low water line, and that a timber fence 17 can be used for retaining logs thereabove.

A gate 18 is provided in the stern end section 11, said gate being hinged on a horizontal axis 19. Axis 19 is located below the low water line a distance sufficient to allow the floating of logs from the flooded enclosure of the vessel. While logs are being transported, gate 18 is supported in an inclined position by a releasable latching means 20. The latching means may be one of a conventional kind, but it should be releasable although under load. A mechanism which is particularly suitable for this purpose is shown and described in United States Patent No. 2,927,550.

It will be apparent that so long as gate 18 is supported in its inclined position, it retains the logs in the enclosures, but upon release of the latching mechanism, the upper edge of the gate takes a position below the low water line, allowing the logs supported thereon to be dumped from the vessel and initiating a flow of logs from the enclosure. It is especially contemplated that an aft chain 21 can be used to help initiate the flow of logs from the stern section 11. One end of chain 21 is connected to a transverse girder 22, the other end being connected to the piston of a hydraulic motor 23 that is automatically actuated upon release of latching mechanism 20 which supports gate 18.

Vessel 10 is provided with other chains or lines 24 to assist unloading and to maintain a flow of logs from points amidship and in the bow section toward the stern end and gate 18. Chains 24, or flexible lines, also function as means for leveling a load of logs, and they can be used to segregate the logs into lots to allow a separate and partial discharge of logs from the vessel. It will be seen that each chain or flexible line extends forward from a point near surface 13 where it is attached to one of the transverse girders 15. Each chain partially encircles a group of logs which is generally forward relative to the points of attachment. The upper ends of chains 24 are adapted to be connected to winding drums not shown. Winding drums driven by hydraulic motors may be mounted to upper girders 16 as required, and it is contemplated that each group of logs be encircled by a plurality of chains 24 connected to a common girder but to separate winding drums mounted on a common shaft.

In addition to chains 24, one or more chains 25 may be provided which extend the entire length of the vessel. These chains may also be operated by a drum, preferably mounted in the vicinity of the discharge gate 18 for cleaning out the entire enclosure.

Figure 3:
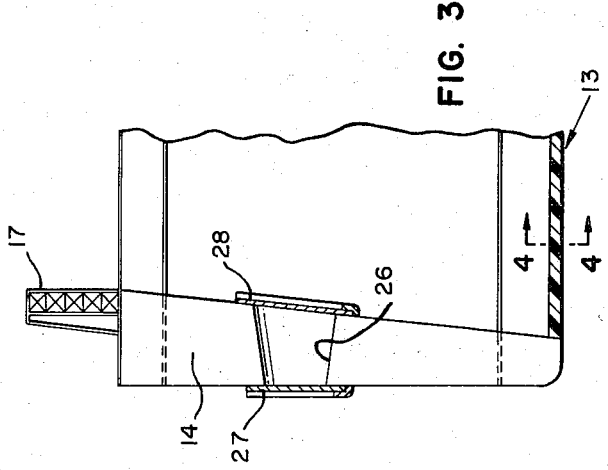
FIG. 3 is an enlarged vertical section through one side of the vessel as taken on lines 3—3 of FIG. 1.

As an added feature, which may be used as an alternate means for removing floating logs, vessel 10 may be formed with one or more auxiliary discharge ports 26 as shown in FIGS. 1 and 3. These discharge ports are employed to speed up the unloading process and they may be located at predetermined water lines, and at several locations along the length of the vessel. The sides of each opening must accommodate the maximum log diameter in the cargo; and an additional allowance of 25% is desirable. It will be noted that the opening 26 is tapered outward and becomes largest on the side of the enclosure, thereby providing a guide for receiving one end of a log. A pair of covers 27 and 28 are used to close over openings 26 while logs are being transported. The covers serve to streamline the sides and avoid unnecessary turbulence that would impede movement of the vessel. Covers 27 and 28 may be removably mounted to the sides 14 by any conventional means, such as by providing retainer strips on the bottom and sides of the opening. The cover plates may then be positioned in front of the opening by simply lowering each plate while sliding it under the edges of the retainer strips.

An important feature of the invention is the use of a buoyant bottom wall comprised of a foamed polychemical 29, such as polyurethane, sandwiched between a pair of tank plates 30 and 31. Wall structure such as this can be prepared by supporting the plates 30 and 31 in spaced relation; the polychemical is then inserted between the plates as a liquid. Chemical action, in the well-known manner, causes the liquid to foam and form a rigid type product.

Figure 4:
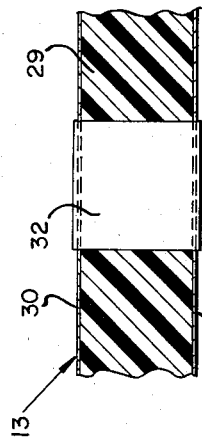
FIG. 4 is an enlarged detail section of the bottom wall as taken on lines 4—4 of FIG. 3.

Referring to FIG. 4, the bottom wall is preferably formed with a plurality of ports 32, spaced and sized as required for allowing a free flow of water into and from the enclosure. Each of the ports 32 can be provided in the bottom wall 13 by placing a standard pipe section through aligned openings in plates 30, 31. The pipe sections are preferably mounted to the plates prior to inserting the liquid foaming agent, then the expanded foam will bind itself to the pipe section also.

A bottom wall of the kind described and shown is of particular utility, not only because of its buoyant character, but also because it obviates the need of painting the insides of the wall plates 30, 31. A crawl space is usually required between a pair of bottom plates, such as 30 and 31, to permit painting of their interior surfaces. However, filling the void space between the plates with a rigid foam that seals itself to the surface of the plates prevents rusting and, therefore, obviates the need of painting. Consequently, plates 30 and 31 can be spaced a distance much less than ordinarily required for a crawl space, thereby increasing the cargo space above the bottom wall 13.

The stern section 11 of vessel 10 is formed with a pair of port and starboard ballast tanks 33. These tanks are used for trimming the vessel as it is unloaded, the need for which will be more readily apparent in view of FIGS. 5 and 6. FIG. 5 illustrates what would normally happen if vessel 10 was partly unloaded leaving a stack of logs in the bow section 12. Although the majority of the weight of the logs is supported by the buoyancy of submerged logs, that portion of the weight which is supported by the vessel might lower the bow section excessively, raising gate 18 above the existing water line and preventing a rearward discharge of logs from the enclosure. The problem is solved, however, by flooding the ballast tanks 33, thereby increasing the weight at the stern end and trimming the vessel. It is also contemplated that the ballast tanks 33 may be used to lower the stern section 11 to assist movement of logs toward gate 18 as well as the discharge of logs from the enclosure.

Vessel 10, as described, requires the use of some independent means for moving it over water. For example, the vessel may be towed or, alternatively, a pusher tug may be used in the lash-up system described in United States Patent No. 2,984,202. It is clearly contemplated, however, that vessel 10 may be constructed as a self-powered vessel if desired.

Although a preferred embodiment of the invention has been illustrated and described, it is believed that various modifications and changes may be made without departing from the spirit of the invention or the scope of the attached claims, and each of such modifications or changes is contemplated.

Having thus described my invention, what I claim and desire to secure by Letters Patent is:

1. A vessel for transporting logs comprising: buoyant means defining a flooded enclosure having a rigid submarine supporting surface and including a gate, the lower portion of said gate being below the low water line and the upper edge of said gate being above the high water line, said gate being pivotally supported on a horizontal axis below the low water line, and further comprising means for releasably latching said gate in an inclined position to support logs thereon and retain logs in the enclosure means, the upper edge of said gate taking a position below said low water line when said latching means is released.

2. The vessel of claim 1 and further comprising means for initiating a flow of logs from said enclosure at points remote from said gate upon release of said latching means.

3. The vessel of claim 1 and further comprising means for leveling a load of logs within said enclosure means and moving logs toward said gate.

4. The vessel of claim 1 and further wherein said enclosure means is provided with auxiliary discharge ports located at predetermined water lines including the low water line of said vessel.

5. The vessel of claim 1 and further comprising at least one flexible line secured near said supporting surface, said line extending forward along said surface and then upward as to partially encircle a group of logs.

6. The vessel of claim 1 and further comprising a plurality of flexible lines, one end of each line being secured to said supporting surface and extending forward along said surface and then upward and partially around a group of logs, said lines being secured at different points longitudinally of said vessel and partially encircling a group of logs different from the group partially encircled by other lines.

References Cited

UNITED STATES PATENTS

| | | | |
|---|---|---|---|
| 1,426,990 | 8/1922 | Johnson | 114—72 |
| 2,075,711 | 3/1937 | Gilley | 9—15 |
| 3,152,570 | 10/1964 | Dyer | 114—69 |

FOREIGN PATENTS 556,629  9/1922  France.

MILTON BUCHLER, *Primary Examiner.*
FERGUS S. MIDDLETON, *Examiner.*
T. MAJOR, *Assistant Examiner.*